Figure 1:
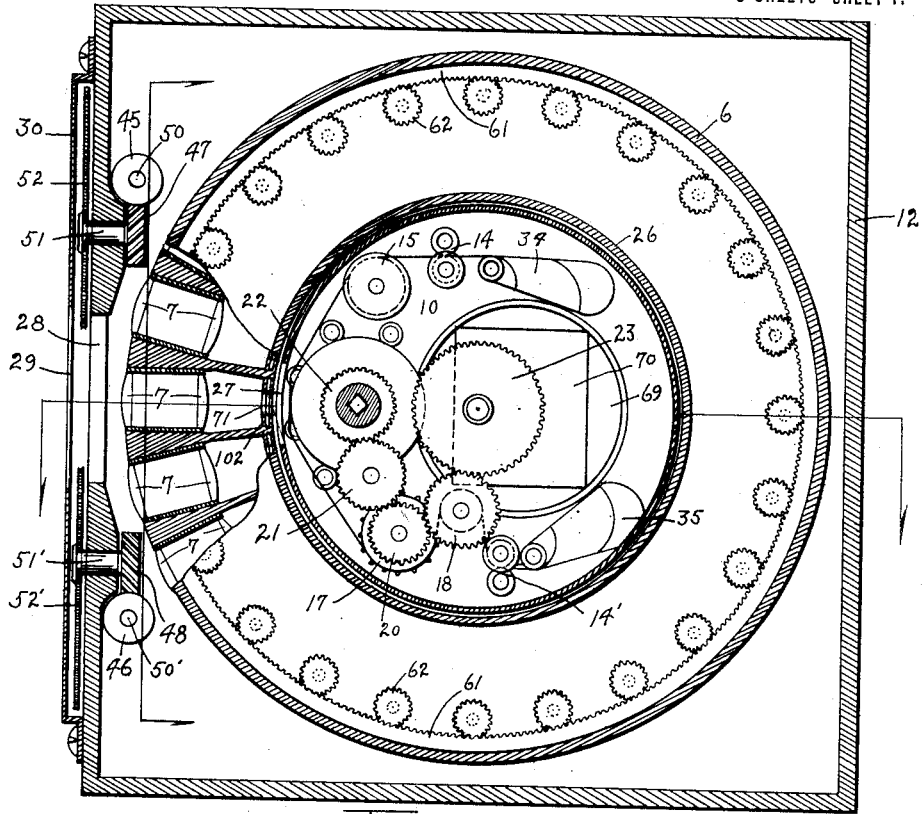

B. A. BRIGDEN.
MOVING PICTURE MACHINE.
APPLICATION FILED SEPT. 19, 1912. RENEWED NOV. 17, 1914.

1,143,607.

Patented June 22, 1915.
3 SHEETS—SHEET 1.

Witnesses

Inventor
Burt A. Brigden
By John A. Bommhardt
Attorney

B. A. BRIGDEN.
MOVING PICTURE MACHINE.
APPLICATION FILED SEPT. 19, 1912. RENEWED NOV. 17, 1914.
1,143,607.
Patented June 22, 1915.
3 SHEETS—SHEET 2.
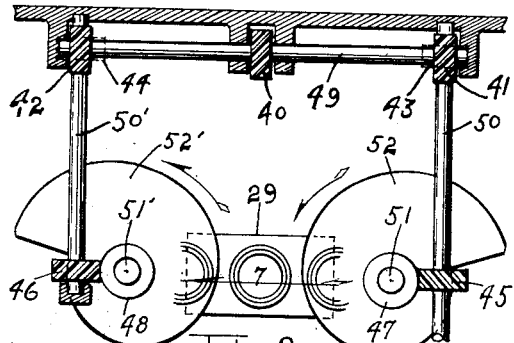
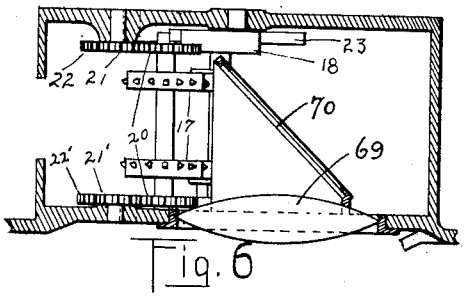
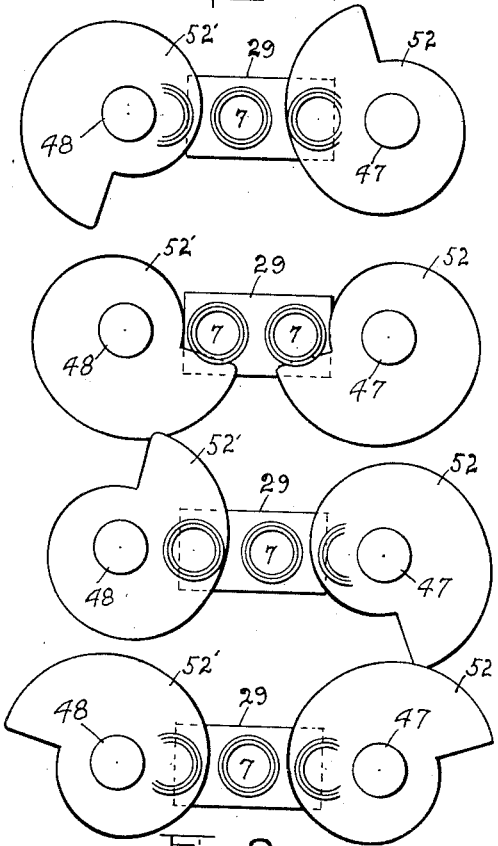
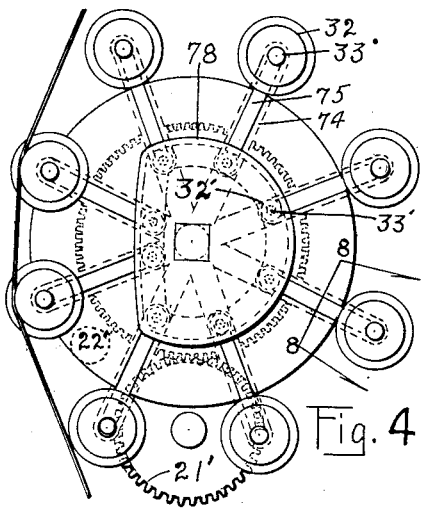
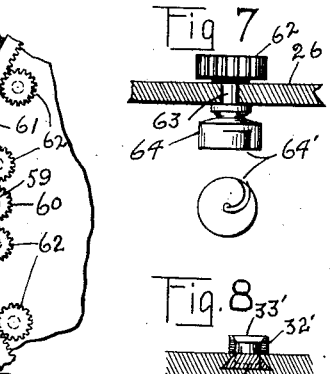
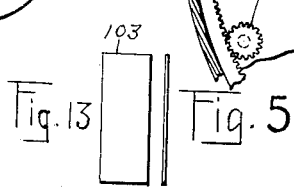
Witnesses
Inventor
Burt A. Brigden
By John A. Bommhardt
Attorney B. A. BRIGDEN.
MOVING PICTURE MACHINE.
APPLICATION FILED SEPT. 19, 1912. RENEWED NOV. 17, 1914.

1,143,607.

Patented June 22, 1915.
3 SHEETS—SHEET 3.

Witnesses

Inventor
Burt A. Brigden
By John A. Bornhardt
Attorney

UNITED STATES PATENT OFFICE.

BURT A. BRIGDEN, OF CLEVELAND, OHIO.

MOVING-PICTURE MACHINE.

1,143,607.      Specification of Letters Patent.      Patented June 22, 1915.

Application filed September 19, 1912, Serial No. 721,250. Renewed November 17, 1914. Serial No. 872,649.

*To all whom it may concern:*

Be it known that I, BURT A. BRIGDEN, citizen of the United States, residing at Cleveland, in the county of Cuyahoga and State of Ohio, have invented certain new and useful Improvements in Moving-Picture Machines, of which the following is a specification.

This invention relates to moving picture machines of the type using a continuously moving film, as distinguished from those having an intermittently moving film, the latter having several defects which need not be particularly referred to.

In machines of the continuously moving film type, efforts have been made to correct the flicker or shaking of the pictures incident to the slight misplacement, lateral or progressive or both of the film at the time of exposure as compared to the preceding position relative to the lens, and for this purpose moving prisms and also moving lenses or objectives have been employed, as well as movable mirrors. The chief defect of the mirror and prism type is that they absorb light, and such machines of the revolving or moving lens type as have come to my attention are clearly impossible or defective for various reasons, such as the defective arc found in the type of machines having lenses which rotate in a plane at a right angle to the axis of the lenses.

It is the object of my invention to remedy these defects and to provide a machine with a continuously moving film in which the pictures will be produced without flicker or vibration, and for this purpose I employ a revolving series of objectives, in connection with a traveling film and a shutter, the film and the objectives traveling in the same direction in the same plane, across the field, in such manner that each succeeding lens takes up the work before the preceding lens is put out of operation by the shutter. Thereby a continuous series of pictures is produced.

The machine is capable of use either as a camera, or as a projecting apparatus, the latter by the addition of a proper source of light directed through the film and the objectives. Also by use of a ray filter or color screen with each lens, and the whole series arranged in proper sequence, either the bi-color or tri-color method of recording and reproducing in colors is greatly improved. The tri-color method is not successful with intermittent feed machines, because the attainable speed without snapping the film is not great enough to obtain persistence of vision. In this device the only limit of speed is the present quality of lenses—sensitiveness of film and the illumination of the field. Therefore persistence of vision and proper register-colors are possible with my more rapidly moving film.

The invention comprises, a novel arrangement and combination of parts, including a reel for flattening the film during the time of exposure, mechanism for operating the various parts, and for focusing the lenses while in motion, and a shutter adapted for moving lenses.

Figure 3:
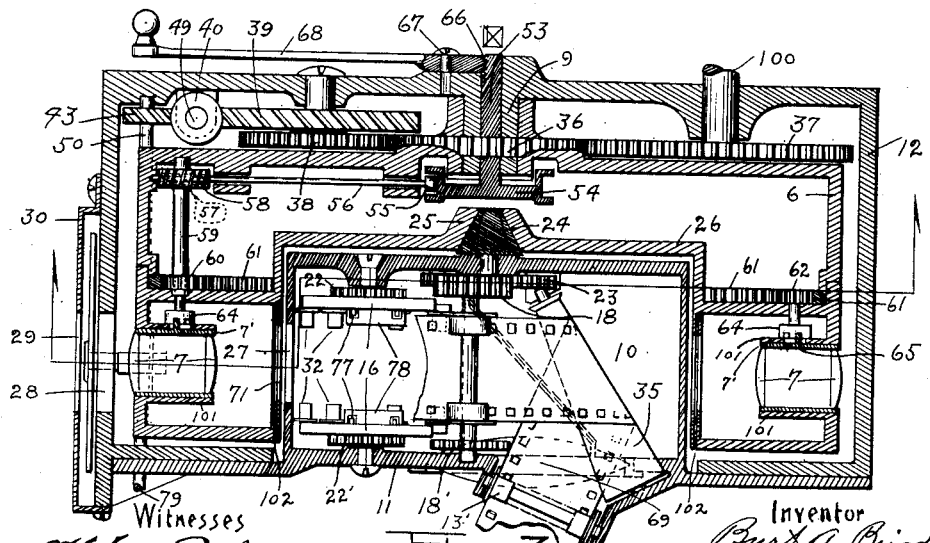
Figure 10:
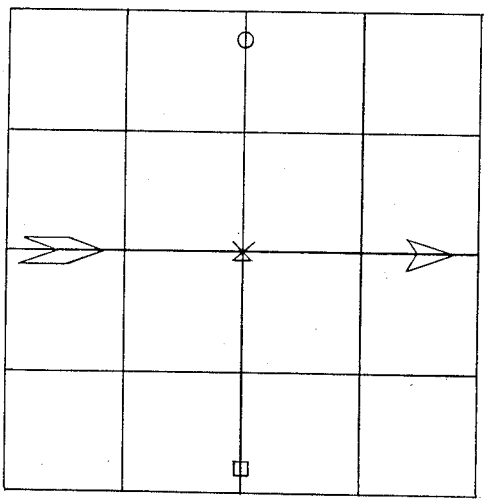
Figure 11:
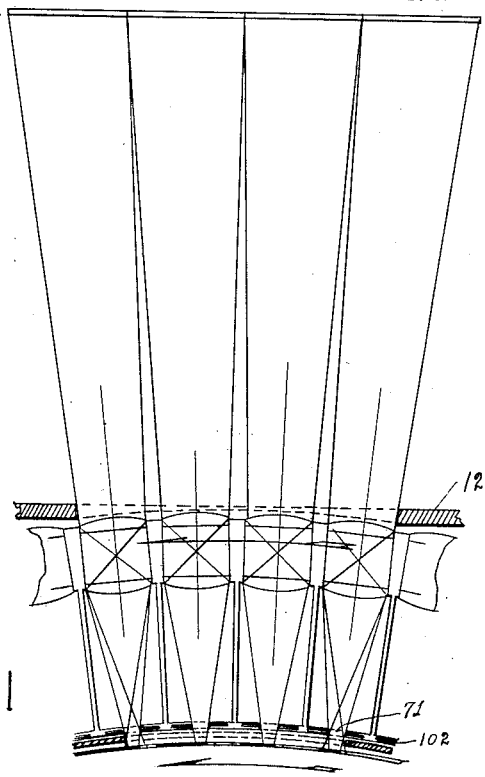
Figure 12:
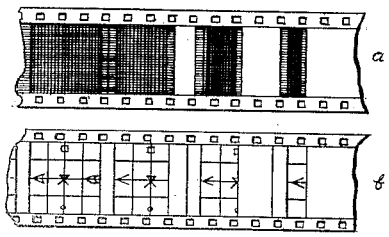

In the accompanying drawings Figure 1 is a plan view of the machine, parts being removed. Fig. 2 is an elevation of the shutter mechanism. Fig. 3 is a central vertical section of the machine. Fig. 4 is a plan of the film flattening reel. Fig. 5 is a detail in plan of the focusing mechanism. Fig. 6 is a detail in section of the condensing lens and mirror and driving gear for sprocket and flattening reel. Fig. 7 is a detail in section of one of the focusing devices. Fig. 8 is a detail in section on the line 8—8 of Fig. 4. Fig. 9 is a diagram illustrating the various positions of the shutters during the exposure through each lens. Fig. 10 is a diagram of a field. Fig. 11 is a vertical view of field with radial lenses operating on film. Fig. 12 illustrates two views of field viz: (*a*) shows progression of exposure and (*b*) shows results of field reversed and inverted. Fig. 13 is a detail of a color screen or ray filter.

Referring specifically to the drawings, 12 indicates an outer casing of suitable shape to inclose the parts hereinafter described.

100 indicates a power shaft which extends through the casing and which drives a gear 37 thereon, said gear meshing with a gear 36 on an inner casing 6 which carries the objectives 7 and which will be referred to hereinafter as the lens carrier. This carrier 6 is provided with an inner horizontal partition 26 and with an internal ring gear 61, friction tight therein, which operates the focusing devices as hereinafter explained.

10 is an inner chamber or cylindrical box which is relatively fixed, being supported by a plate 11 connected to the outer casing 12. The wall of the chamber 10 has an opening 27 at one side, through which the image is received or projected, said opening being in line with an opening 28 in the outer casing 12. The film enters the chamber 10 over guide rollers and through aperture in plate 11, and passes around a conical roller 34, thence over guide rollers 14 and 15, thence across the film flattening reel, thence over motion sprocket 17, guide rollers 18, 14′ and conical roller 35, and out through the aperture in the casing and over guide rollers 13′. The film may be supplied to and from any suitable winding reels, not shown.

The box or chamber 10 contains the flattening reel for the film. This comprises a pair of upper and lower plates 16, each of which is provided with rollers 32 across which the film passes, said film being driven at uniform motion by a sprocket 17. The rollers 32 turn on pins 33 mounted at the ends of arms 75 which slide radially in undercut grooves 74 in the plates 16, and as the reel rotates the rolls 32 are caused to travel in a line parallel to the outer periphery of the lens carrier past the exposure opening 27, by means of a fixed plate 78 having a cam groove 77 in which travels rollers 32′ mounted on pins 33′ at the inner ends of the arms 74, as shown in Fig. 4, obtaining a flat film moving perpendicularly to the axis of the lens operating on this part of the film during its transit of opening 27, or in other words, the film is thus flattened and as the flattening reel moves in unison with the lenses the film is perpendicular to the axis of the lens during each exposure.

For driving the reel, and the driving sprocket, the plate 26 carried by the casing 6 has a female friction clutch member 25, the surface of which is engaged at the center by a male clutch member 24 which carries, within the chamber 10, a gear 23 which meshes with a gear 18 which drives gears 20, 21, and 21′ and 22 and 22′, the first carrying the sprocket 17 and the last two carrying the reel plates and thus driving the flattening reel.

For projecting, I provide a condenser 69 in the casing through which light from any suitable source is transmitted to a mirror 70 supported by a frame connected with condenser support, which reflects light through the film and objectives and the openings 27 and 28 to the suitable surface on which the pictures are reproduced. The casing 6 turns on a sleeve bearing 9 on the outer casing, and in this sleeve 9 is a square rod 53 having at its outer end mutilated threads or ribs 66 engaged by the threaded end of a lever 68 which is fulcrumed at 67 and which may be swung one way or the other to slightly move the rod 53 in or out. At its inner end this rod carries a circular grooved disk 54 between the flanges of which is received the enlarged circular part 55 of a shaft 56, the outer end of which has a worm 57 meshing with a gear 58 on the shaft 59 which has a gear 60 meshing with the internal ring gear 61 which is frictionally carried by the casing 6, but which is capable of movement relative thereto. The gear 61 engages a series of gears 62, corresponding in number and position to the objectives, said gears 62 being mounted on stub shafts 63 (see Fig. 7) which are carried in plate 26. Each shaft 63 has a head 64 with a cam slot 64′ which receives a pin 65 projecting through a longitudinal slot in a fixed barrel 101, from the inner barrel 7′ which holds the lenses 7.

By means of the lever 68, the rod 53 may be moved in or out to engage either flange of the disk 54 with the head 55 on the shaft 56, to drive said shaft in either direction, and the motion of this shaft is communicated, greatly reduced, to the gear 61, by means of the connecting gearing 58, 59 and 60, whereby said gear 61 is revolved or moved relative to the rotating casing 6, and this relative movement being communicated through the gears 62, the heads 64 are caused to turn on the axis of the shafts 63 which, by means of the cam groove 64′ and the pins 65, advances or retracts the barrel 7′ to focus the objectives, after which, by opposite movement of the lever 68, the disk 54 is disengaged from the head 55 and the parts run idly. Thereby the lenses may be focused during the operation of the machine.

The shutters are unique, and are constructed for the purpose of producing the successive exposures at proper times, and in proper positions, to accord with the movement of the objectives. As a camera each individual picture is produced by a single lens, but a second picture is begun before the preceding one is finished. As a projector, during the passage of the lenses and the film across the exposure opening, a condition or period will exist during which the picture will be produced in part through one lens and in part through another or others, causing to be shown on the screen a complete picture at every instant. The shutter is so constructed that the image or picture as shown through one of the lenses is cut off after the following lens becomes operative. The shutter therefore comprises two rotating thin opaque plates 52 and 52′ with arcuate recesses which in plate 52 gradually decreases in width in a helical curve from a point where full exposure begins to a point where the curve merges into the outer circumferential line. In plate 52′ the recess gradually increases in width after covering the lens which has completed its exposure. Said plates rotate in the same direction, and at the point where two objectives are uncovered, as shown in Fig. 2, a part of the picture on the screen comes from each lens, that is, the part in line with the opening 71 between the film and each lens, and as the objectives pass across the field the light from one is suddenly cut off by one blade after the following one is uncovered by the other, the shutter following the movement of the lenses across the aperture 28, whereby instead of an intermittent exposure or illumination, a practically continuous exposure is effected, and the picture at times being composed of parts projected through two lenses. The shutter, therefore, has the effect of a moving slot traveling with the objectives and at the same speed across the exposure opening in one direction and quickly beginning the next movement across said opening. For operating the shutter, the gear 36 meshes with the gear 38, the shaft of which carries a spiral gear 39 which drives spiral gear 40 on the shaft 49 which, by means of meshing gears 41 and 43 and 42 and 44 drives the shafts 50 and 50' which carry the spiral gears 45 and 46 which drive the gears 47 and 48 on the shafts 51 and 51' of the shutters 52 and 52', the gearing being properly proportioned to produce a movement of the shutters which corresponds with the revolution of the objectives across the exposure plane.

It will be seen that instead of the operation of the intermittent film feed, or the intermittent exposure of successive portions of a continuous film, with devices for correcting the angularity of the rays, this apparatus produces a practically continuous picture built up by progressive exposure of a picture through successive lenses, the exposure of one lens being successively cut off and that of another lens being added so that the work of a succeeding lens commences before that of a preceding lens is finished, the picture thus at times being produced by light passing through more than one objective. The flattening of the film as it passes across the exposure position perpendicular to the axis of the lens is, it will be understood, essential to produce a perfect focus at all parts of the picture.

The invention is not limited to the particular embodiment or machine shown and described, but may be modified in various ways within the scope thereof.

With the width of opening 71 restricted and an increased number of lenses in a carrier with larger periphery, reducing the angle formed by the axes of adjoining lenses, and the shutters properly spaced, a plurality of lenses greater than two may be operative at the same time without giving a greater angle of field. Under this condition the shutters could be omitted with the result of a slight vignetting on each end of each picture.

The possibilities of the machine for color work have been referred to above, and in this use proper color screens or ray filters 103 will be placed in the grooves 102 in the lens carrier, behind the several lenses, in proper sequence.

It may be stated, and will be apparent from Fig. 11, that the film moves faster than the lens carrier, in order to bring into position for exposure, fresh parts of the film as a lens "picks up" new parts of the field, and the excess speed of the film exceeds the speed of the lenses an amount sufficient to bring such new part of the film in position. In other words, the film moves in unison with the movement of the image as it is successively built up by the travel of each objective across the exposure opening and the relative movement of the slot 71, which determines the section of field recorded. The slot 71 represents the angle of the field necessary, in projecting, to make, with those of its operative neighbors, a complete image on the screen. For example, if the lenses are spaced four degrees axis to axis, each lens can only project four degrees of the field without overlapping and producing at that point on the screen an objectionable parallax, hence each slot should permit only four degrees of the field to pass at any instant.

What I claim is:

1. In a moving picture apparatus, the combination of a traveling film, and a succession of radial objectives traveling in the same direction as the film across the exposure opening, and means whereby a plurality of objectives will simultaneously operate on different parts of the field during movement across the exposure opening.

2. In a moving picture apparatus, the combination of a traveling film, and a succession of radial objectives, traveling in the same direction as the film across the exposure opening, and a shutter, the opening of which at each operation travels with the movement of the objectives across said opening.

3. In moving picture apparatus, the combination of a circular rotatable carrier having a central recess, a series of lenses disposed radially on said carrier, around said recess, and means within said recess for supporting and advancing a traveling picture strip in position for exposure through said lenses successively.

4. In a moving picture apparatus, the combination of a circular revolving carrier having a central recess, a series of radial objectives mounted on said carrier, a relatively fixed casing located within said recess, and having an exposure opening, and means located within said casing to advance a film across said opening, in position for exposure through the objectives successively.

5. In moving picture apparatus, the combination of a revolving ring of radial objectives and means to make exposures through the same successively, and means to simultaneously focus the said objectives while the ring is moving.

6. In moving picture apparatus, the combination of a revolving carrier, a series of objectives provided with adjustable holders and mounted radially on said carrier, and gearing operatively connected to each holder, and means to actuate said gearing to simultaneously adjust the holders, to focus the objectives while in motion, and means to expose a film through said objectives successively.

7. In moving picture apparatus, the combination of a revolving carrier, a series of lens holders mounted radially thereon and adjustable to focus the lenses, means to expose a picture strip in succession through said lenses, a gear wheel mounted on said carrier and movable normally therewith and also movable relatively thereto, adjusting devices between said gear wheel and the holders and operated by the gear wheel, and means to produce relative movement of the gear wheel and the carrier during revolution.

8. In moving picture apparatus, the combination of a revolving carrier, a series of lens holders mounted radially thereon and adjustable to focus the lenses, means to expose a picture strip in succession through said lenses, a gear wheel mounted on said carrier and movable normally therewith and also movable relatively thereto, adjusting devices between said gear wheel and the holders and operated by the gear wheel and means to produce relative movement of the gear wheel and the carrier in either direction during revolution.

9. In moving picture apparatus, the combination of a series of traveling radial objectives, and means to support and advance a film for exposure through said objectives, including a revolving reel provided with rollers over which the film travels, across the exposure opening.

10. In a moving picture apparatus, the combination of a series of traveling radial objectives, and means to support and advance a film for exposure through said objectives, including a revolving reel provided with rollers over which the film travels and means to shift the rollers to cause the film to travel in a plane perpendicular to the axis of each lens across said exposure opening.

11. In a moving picture apparatus, the combination of revolving series of objectives disposed radially, means to advance a film in the same direction and plane of movement as said objectives, for exposure through the same successively, said means including a rotary reel provided with rollers over which the film passes, and means to shift the position of certain of said rollers to cause the film to pass the exposure opening in a plane perpendicular to the axis of each lens during exposure.

12. In a moving picture apparatus, the combination of an annular lens carrier, the lenses being arranged radially in a series thereon, a casing within the central recess of said carrier, means to support and advance a picture film in said recess, means to expose the film through said lenses successively, and a mirror located in said recess and arranged to project light through the film and lenses, as they pass the exposure opening.

13. In a moving picture apparatus, the combination of an annular lens carrier with a series of lenses disposed radially thereon, a revolving film carrier located in the central recess of the lens carrier, and means to drive the film carrier, including a friction clutch located at the axis of the lens carrier.

14. In a moving picture apparatus, the combination of a revolving carrier, a series of lenses mounted radially thereon, means to support and advance a film for exposure through said lenses successively, and means to focus the lenses including a disk with respect to which the carrier revolves, and gearing engageable with and driven by said disk and operating between the same and the lenses to adjust the latter.

15. In a moving picture apparatus, the combination of a rotary carrier, a series of lenses disposed radially therein, and carried thereby, and means for supporting and moving a film across the exposure opening in unison with the movement of the image of the field projected by the operating lens.

16. In a moving picture apparatus, the combination of a rotary carrier, a series of lenses disposed radially therein, and carried thereby, and means for supporting and moving a film across the exposure opening in unison with the movement of the image of the field projected by the operating lens, and shutter means to cause an exposure opening to travel with objectives across field of view and to quickly begin the next movement across said field.

17. In a moving picture apparatus, the combination of an annular lens carrier, the lenses being arranged radially thereon, each lens fitted with a ray filter or color screen and placed in proper sequence to produce approximately natural colors when projected, a casing within a central recess of said carrier, means to support and advance a picture film in said recess, means to expose the film through said lenses successively, and a mirror located in said recess and arranged to project light through the film and ray filters or color screens and lenses as they pass the exposure opening.

18. In a moving picture apparatus, the combination of a chamber having an exposure opening, a series of lenses revolving around said chamber to pass across said opening, and means to support and advance a film in said chamber, behind said opening.

19. In a moving picture apparatus, the combination of a rotary carrier, a succession of objectives carried thereby, said carrier having slots through which the exposure is made through a plurality of objectives simultaneously, the width of the slots corresponding to the angle between the objectives, in order to produce a complete image, and means for supporting and advancing a traveling picture strip in position for exposure through the objectives and slots successively.

20. In a moving picture apparatus, the combination of a rotary carrier, a succession of objectives carried thereby, a plurality of objectives being simultaneously operative, means for supporting and advancing a traveling picture strip in position for exposure through said objectives successively, and means for restricting the angle of the field exposed through each objective, to avoid parallax and form a complete image.

21. In a moving picture apparatus, the combination of a rotary carrier, a succession of radial objectives carried thereby and disposed at the same angle apart, means for supporting and advancing a traveling picture strip in position for exposure through a plurality of said objectives, and means for restricting the angle of the field exposed through each objective to an angle equal to that between the objectives.

In testimony whereof, I do affix my signature in presence of two witnesses.

BURT A. BRIGDEN.

Witnesses:
JOHN A. BOMMHARDT,
STEDMAN J. ROCKWELL.